US012056604B2

(12) United States Patent
Seshadri et al.

(10) Patent No.: US 12,056,604 B2
(45) Date of Patent: Aug. 6, 2024

(54) HIGHLY PERFORMANT PIPELINE PARALLEL DEEP NEURAL NETWORK TRAINING

(71) Applicant: MICROSOFT TECHNOLOGY LICENSING, LLC, Redmond, WA (US)

(72) Inventors: Vivek Seshadri, Bangalore (IN); Amar Phanishayee, Redmond, WA (US); Deepak Narayanan, Stanford, CA (US); Aaron Harlap, Pittsburgh, PA (US); Nikhil Devanur Rangarajan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 736 days.

(21) Appl. No.: 16/024,369

(22) Filed: Jun. 29, 2018

(65) Prior Publication Data

US 2019/0362227 A1 Nov. 28, 2019

Related U.S. Application Data

(60) Provisional application No. 62/675,497, filed on May 23, 2018.

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .. G06N 3/02; G06N 3/06; G06N 3/04; G06N 3/08
See application file for complete search history.

(56) References Cited

U.S. PATENT DOCUMENTS

2014/0142929 A1* 5/2014 Seide ................. G06N 3/08 704/202
2016/0092765 A1* 3/2016 Chilimbi ............... G06N 3/084 706/25

(Continued)

FOREIGN PATENT DOCUMENTS

CN 105378762 A 3/2016
CN 107112005 A 8/2017

OTHER PUBLICATIONS

Teerapittayanon et al., "Distributed Deep Neural Networks over the Cloud, the Edge and End Devices", Jun. 5-8, 2017, 2017 IEEE 37th International Conference on Distributed Computing Systems, pp. 328-339. (Year: 2017).*

(Continued)

*Primary Examiner* — Kamran Afshar
*Assistant Examiner* — Lokesha G Patel
(74) *Attorney, Agent, or Firm* — Newport IP, LLC; Jacob P. Rohwer

(57) ABSTRACT

Layers of a deep neural network (DNN) are partitioned into stages using a profile of the DNN. Each of the stages includes one or more of the layers of the DNN. The partitioning of the layers of the DNN into stages is optimized in various ways including optimizing the partitioning to minimize training time, to minimize data communication between worker computing devices used to train the DNN, or to ensure that the worker computing devices perform an approximately equal amount of the processing for training the DNN. The stages are assigned to the worker computing devices. The worker computing devices process batches of training data using a scheduling policy that causes the workers to alternate between forward processing of the batches of the DNN training data and backward processing of the batches of the DNN training data. The stages can be (Continued)

configured for model parallel processing or data parallel processing.

13 Claims, 9 Drawing Sheets

(56) References Cited

U.S. PATENT DOCUMENTS

| | | | |
|---|---|---|---|
| 2016/0267380 A1 | 9/2016 | Gemello et al. | |
| 2016/0379108 A1* | 12/2016 | Chung | G06N 3/04 706/27 |
| 2017/0024849 A1* | 1/2017 | Liu | G06N 3/045 |
| 2019/0114537 A1* | 4/2019 | Wesolowski | G06N 3/084 |

OTHER PUBLICATIONS

Luo et al., "Parameter Hub: a Rack-Scale Parameter Server for Distributed Deep Neural Network Training", May 21, 2018, arXiv:1805.07891v1, pp. 1-15. (Year: 2018).*
"International Search Report and Written Opinion Issued in PCT Application No. PCT/US19/030988", Mailed Date :Jul. 29, 2019, 11 Pages.
"Distributed Messaging", Retrieved from: http://zeromq.org/, Retrieved on Nov. 13, 2017, 1 Page.
Abadi, et al., "TensorFlow: A System for Large-scale Machine Learning", In Proceedings of the 12th USENIX Symposium on Operating Systems Design and Implementation, Nov. 2, 2016, pp. 265-283.
Bengio, Yoshua, "Practical recommendations for gradient-based training of deep architectures", In Neural Networks: Tricks of the Trade—Second Edition, Sep. 16, 2012, pp. 1-33.
Chen, et al., "MXNet: A Flexible and Efficient Machine Learning Library for Heterogeneous Distributed Systems", In Journal of the Computing Research Repository, Dec. 2015, pp. 1-6.
Chilimbi, et al., "Project Adam: Building an Efficient and Scalable Deep Learning Training System", In Proceedings of 11th USENIX Symposium on Operating Systems Design and Implementation, Oct. 6, 2014, pp. 571-582.
Coleman, et al., "DAWNBench: An End-to-End Deep Learning Benchmark and Competition", In Proceedings of 31st Conference on Neural Information Processing Systems, Dec. 4, 2017, 10 Pages.
Cui, et al., "Geeps: Scalable deep learning on distributed gpus with a gpu-specialized parameter server", In Proceedings of the Eleventh European Conference on Computer Systems, Apr. 18, 2016, 16 Pages.
Dean, et al., "Large scale distributed deep networks", In Proceedings of the 25th International Conference on Neural Information Processing Systems—vol. 1, Dec. 3, 2012, pp. 1-11.
Duchi, et al., "Adaptive Subgradient Methods for Online Learning and Stochastic Optimization", In Journal of Machine Learning Research, vol. 12, Feb. 1, 2011, pp. 2121-2159.
Goyal, et al., "Accurate, large minibatch SGD: training imagenet in 1 hour", In Journal of Computing Research Repository, Jun. 2017, pp. 1-12.
Hadjis, et al., "Omnivore: An optimizer for multi-device deep learning on cpus and gpus.", In Journal of Computing Research Repository, Jun. 2016, 38 Pages.
He, et al., "Deep residual learning for image recognition", In Journal of the Computing Research Repository, Dec. 2015, pp. 1-12.
Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 1, 2012, pp. 82-97.
Ioffe, et al., "Batch normalization: accelerating deep network training by reducing internal covariate shift", In Proceedings of the 32nd International Conference on Machine Learning, Jul. 6, 2015, 9 Pages.

Jia, et al., "Caffe: Convolutional architecture for fast feature embedding", In Journal of Computing Research Repository, Aug. 2014, 4 Pages.
Kalchbrenner, et al., "A convolutional neural network for modelling sentences", In Journal of Computing Research Repository, Apr. 2014, 11 Pages.
Karpathy, et al., "Large-Scale Video Classification with Convolutional Neural Networks", In Proceedings of IEEE Conference on Computer Vision and Pattern Recognition, Jun. 2014, pp. 1725-1732.
Keskar, et al., "On large-batch training for deep learning: Generalization gap and sharp minima", In Journal of Computing Research Repository, Sep. 2016, 16 Pages.
Kingma, et al., "Adam: A method for stochastic optimization", In Journal of Computing Research Repository, Dec. 2014, pp. 1-15.
Krizhevsky, Alex, "Learning Multiple Layers of Features from Tiny Images", In Technical report, University of Toronto, Apr. 8, 2009, 60 Pages.
Krizhevsky, Alex, "One weird trick for parallelizing convolutional neural network", In Journal of Computing Research Repository, Apr. 2014, pp. 1-7.
Leslie, Valiant G., "A bridging model for parallel computation", In Communications of the ACM, vol. 33, Issue 8, Aug. 1990, pp. 103-111.
Li, et al., "Efficient mini-batch training for stochastic optimization", In Proceedings of the 20th ACM SIGKDD International conference on Knowledge discovery and data mining, Aug. 24, 2014, pp. 661-670.
Li, et al., "Scaling distributed machine learning with the parameter server", In Proceedings of the 11th USENIX conference on Operating Systems Design and Implementation, Oct. 6, 2014, pp. 583-598.
Mockus, J., "On bayesian methods for seeking the extremum", In Optimization Techniques IFIP Technical Conference, Jul. 1, 1974, pp. 400-404.
Ngiam, et al., "On optimization methods for deep learning", In Proceedings of the 28th international conference on machine learning, Jun. 28, 2011, 8 Pages.
Paszke, et al., "pytorch", Retrieved from: https://github.com/pytorch/pytorch, Retrieved on Nov. 13, 2017, 6 Pages.
Ramachandran, et al., "Swish: a self-gated activation function", In Journal of Computing research Repository, Oct. 2017?, pp. 1-12.
Russakovsky, et al., "ImageNet Large Scale Visual Recognition Challenge", In International Journal of Computer Vision, vol. 115, Issue 3, Dec. 2015, pp. 1-43.
Seide, et al., "1-Bit Stochastic Gradient Descent and its Application to Data-Parallel Distributed Training of Speech DNNs", In Proceedings of 15th Annual Conference of the International Speech Communication Association, Sep. 14, 2014, pp. 1058-1062.
Seide, et al., "CNTK: Microsoft's Open-Source Deep-Learning Toolkit", In Proceedings of the 22nd ACM SIGKDD International Conference on Knowledge Discovery and Data Mining, Aug. 13, 2016,, pp. 2135-2135.
Sergeev, et al., "Meet Horovod: Ubers Open Source Distributed Deep Learning Framework for TensorFlow", Retrieved from: https://eng.uber.com/horovod/, Oct. 17, 2017, 18 Pages.
Simonyan, et al., "Very deep convolutional networks for large-scale image recognition", In Journal of the Computing Research Repository, Sep. 2014, pp. 1-14.
Snoek, et al., "Practical Bayesian Optimization of Machine Learning Algorithms", In Proceedings of Advances in Neural Information Processing Systems, Dec. 31, 2012, 9 Pages.
Sparks, et al., "Automating model search for large scale machine learning", In Proceedings of the Sixth ACM Symposium on Cloud Computing, Aug. 27, 2015, 13 Pages.
Sutskever, et al., "Sequence to Sequence Learning with Neural Networks", In Proceedings of Advances in neural Information processing systems, Dec. 8, 2014, pp. 1-9.
Thakur, et al., "Optimization of collective communication operations in mpich", In the International Journal of High Performance Computing Applications, vol. 19, Issue 1, Feb. 2005, pp. 1-17.
Vinyals, et al., "Show and Tell: A Neural Image Caption Generator", In Journal of Computing Research Repository, Nov. 2014, 9 pages.

(56) References Cited

OTHER PUBLICATIONS

Goodfellow, et al., "Deep Learning", MIT Press, 2016, 2 pages. http://www.deeplearningbook.org.
"Office Action Issued in European Patent Application No. 19724715.8", Mailed Date: Sep. 24, 2021, 8 Pages.
"Office Action Issued in Indian Patent Application No. 202017050201", Mailed Date: Aug. 31, 2022, 6 Pages.
"Office Action Issued in European Patent Application No. 19724715.8", Mailed Date: Jun. 17, 2022, 5 Pages.
"Summons to Attend Oral Proceedings Issued in European Patent Application No. 19724715.8", Mailed Date: Jan. 4, 2023, 8 Pages.
"Notice of Allowance Issued in European Patent Application No. 19724715.8", Mailed Date: Jul. 27, 2023, 2 Pages.
U.S. Appl. No. 62/675,497, filed May 23, 2018.
"Notice of Allowance Issued in European Patent Application No. 19724715.8", Mailed Date: Jun. 1, 2023, 8 Pages.
Notification of First Office Action Received for Chinese Application No. 201980033991.4, mailed on Apr. 15, 2024, 23 pages (English Translation Provided).
Notification of Second Office Action Received for Chinese Application No. 201980033991.4, mailed on May 15, 2024, 6 pages (English Translation Provided).

\* cited by examiner

HIGHLY PERFORMANT PIPELINE PARALLEL DEEP NEURAL NETWORK TRAINING

CROSS-REFERENCE TO RELATED APPLICATIONS

This application claims priority under 35 U.S.C. § 119(e) to U.S. Provisional Patent Application No. 62/675,497, filed on May 23, 2018, and entitled "Fast and Efficient Pipeline Parallel Deep Neural Network Training," the disclosure of which is expressly incorporated by reference herein in its entirety.

BACKGROUND

Deep neural networks ("DNNs") are loosely modeled after information processing and communication patterns in biological nervous systems, such as the human brain. DNNs can be utilized to solve complex classification problems such as, but not limited to, object detection, semantic labeling, and feature extraction. As a result, DNNs form the foundation for many artificial intelligence ("AI") applications, such as computer vision, speech recognition, and machine translation. DNNs can match or exceed human accuracy in many of these domains.

The high-level of performance of DNNs stems from their ability to extract high-level features from input data after using statistical learning over a large data set to obtain an effective representation of an input space. However, the superior performance of DNNs comes at the cost of high computational complexity. High performance general-purpose processors, such as graphics processing units ("GPUs"), are commonly utilized to provide the high level of computational performance required by many DNN applications.

As DNNs have become more widely developed and used, however, model sizes have grown to increase effectiveness. Models today have tens to hundreds of layers, commonly totaling 10-20 million parameters. Such growth not only stresses the already time- and resource-intensive DNN training processes, but also causes commonly used parallelization approaches for training DNNs to break down.

It is with respect to these and other technical challenges that the disclosure made herein is presented.

SUMMARY

Technologies are disclosed herein for highly performant pipeline parallel DNN model training. The disclosed DNN model (which might be referred to herein simply as a "DNN") training system parallelizes training of DNN models by pipelining aspects of the training process across computing devices configured to process ranges of DNN layers. In addition to other technical benefits, the disclosed pipeline parallel computing technologies can eliminate the performance impact incurred by previous parallelization approaches when training large DNN models or when limited network bandwidth induces high communication-to-computation ratios.

The disclosed pipeline parallel DNN training technologies can also reduce communication overhead by up to ninety-five percent (95%) for large DNN models relative to data parallel training by enabling overlapping communication and computation. Additionally, the disclosed technologies can keep GPUs productive by partitioning DNN layers among pipeline stages to balance work and minimize communication, versioning model parameters for backward pass correctness, and scheduling the forward and backward passes of a bi-directional training pipeline.

Using the mechanisms described briefly above and more fully below, implementations of the disclosed technologies have been shown to be up to five times faster in "time to target accuracy" for DNN training as compared to data parallel training. This increase in efficiency can reduce the utilization of various types of computing resources including, but not limited to, memory, processor cycles, network bandwidth, and power. Other technical benefits not specifically identified herein can also be realized through implementations of the disclosed technologies.

In order to realize the technical benefits mentioned briefly above, and potentially others, the disclosed technologies utilize a combination of pipelining, model parallelism, and data parallelism. This combination is referred to herein as "pipeline parallel" DNN training. In order to implement pipeline parallel DNN training, a profile of a DNN model is generated. The DNN profile can be generated by executing the DNN on a small number of computing devices (e.g. one) with a subset of the DNN training data (e.g. several thousand minibatches) for a predetermined period of time.

Once the DNN profile has been generated, the layers of the DNN model are partitioned into stages based upon the profile. Each of the stages includes one or more layers of the DNN model. In some embodiments, the partitioning of the DNN is optimized to minimize the time to train the DNN model to a desired level of accuracy.

The partitioning of the DNN model might also, or alternately, be optimized to minimize data communication between the computing devices or to configure the computing devices used to train the DNN model to each perform approximately the same amount of processing during training. Partitioning the layers of the DNN model might also include computing an optimal number of batches of DNN training data to provide to the computing devices used for training to maximize their processing efficiency.

Once the DNN model has been partitioned into stages, the stages are individually assigned to the computing devices that will train the DNN model. Some or all of the stages can be configured for model parallel processing, and some or all of the stages can be configured for data parallel processing.

The computing devices are configured with a one-forward one-backward ("1F1B") scheduling policy in some configurations. The 1F1B scheduling policy configures the computing devices to alternate between forward processing of the batches of the DNN training data and backward processing of batches of the DNN training data. Once the computing devices have been configured in this manner, they can begin processing the DNN training data to train the DNN model.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
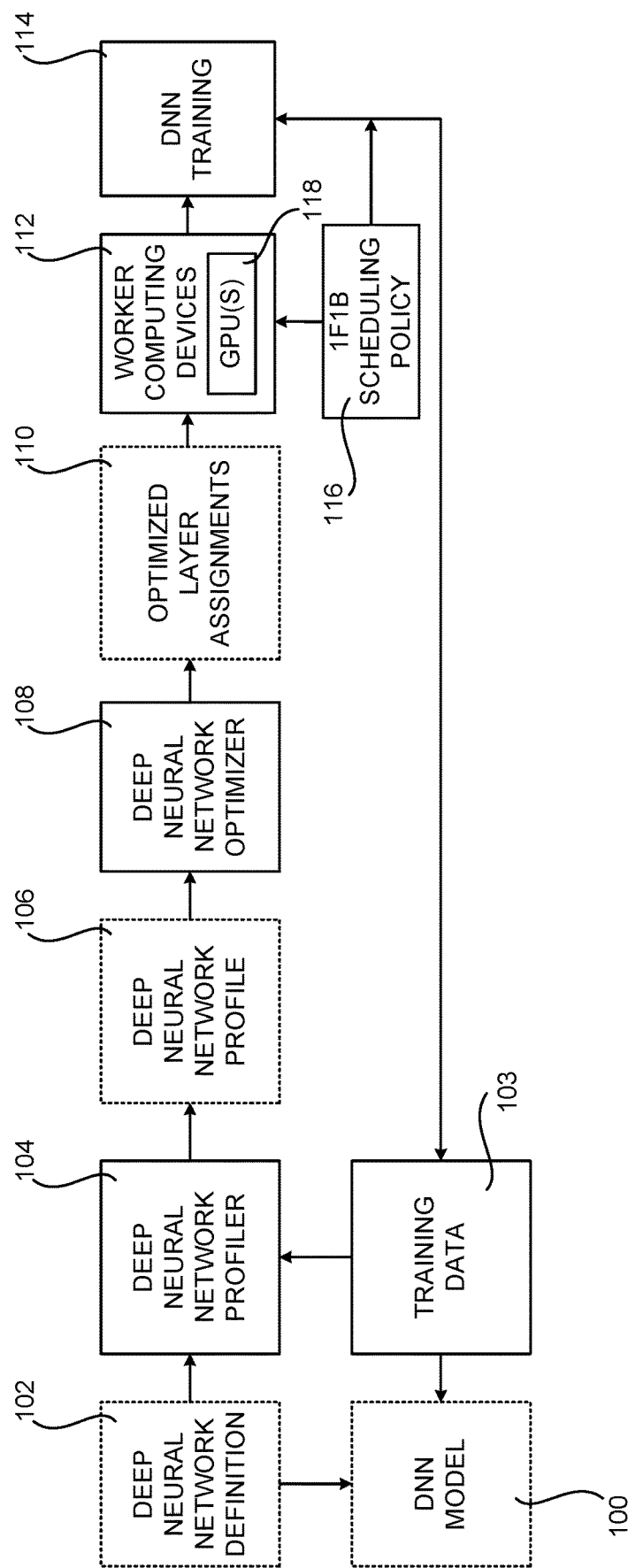
FIG. 1 is a computing architecture diagram that shows aspects of one mechanism disclosed herein for configuring computing devices to implement pipeline parallel DNN training.

The following detailed description is directed to technologies for highly performant pipeline parallel DNN model training. In addition to other technical benefits, the disclosed technologies can eliminate the performance impact incurred by previous parallelization techniques when training large DNN models or when network bandwidth induces high communication-to-computation ratios. The disclosed technologies can also partition the layers of a DNN model among pipeline stages to balance work and minimize network communication, and efficiently schedule the forward and backward passes of a bi-directional DNN training pipeline. These aspects of the disclosed technologies, and others, can reduce the utilization of various types of computing resources including, but not limited to, memory, processor cycles, network bandwidth, and power. Other technical benefits not specifically identified herein can also be realized through implementations of the disclosed technologies.

Prior to describing the disclosed technologies for pipeline parallel DNN training, a brief overview of DNN models, DNN model training, and several approaches to parallel training of DNN models will be provided. A DNN model generally consists of a sequence of layers of different types (e.g. convolutional, fully connected, and pooling layers). DNN models are typically trained using a labeled dataset (e.g. a set of images that have been labeled with data describing the content in the images). A DNN model is trained across multiple epochs. In each epoch, the DNN model trains over all of the training data in the dataset in multiple steps. In each step, the current model first makes a prediction for a subset of the training data, which might be referred to herein as a "minibatch" or a "batch." This step is commonly referred to as a "forward pass."

To make a prediction, input data from a minibatch is fed to the first layer of the DNN model, which is commonly referred to as an "input layer." Each layer of the DNN model then computes a function over its inputs, often using learned parameters, or weights, to produce an input for the next layer. The output of the last layer, commonly referred to as the "output layer," is a class prediction. Based on the label predicted by the DNN model and the actual label of each instance of training data, the output layer computes a loss, or error function. In a "backward pass" of the DNN model, each layer of the DNN model computes the error for the previous layer and the gradients, or updates, to the weights of the layer that move the DNN model's prediction toward the desired output.

One goal of DNN training is to obtain a DNN model having a desired level of accuracy in as little time as possible. This goal can be quantified with two metrics: statistical efficiency (i.e. the number of epochs required to reach a desired level of accuracy) and hardware efficiency (i.e. the time required to complete a single epoch). The total training time to reach a desired accuracy level is the product of these two metrics. The result of training a DNN model is a set of parameters, called "weights" or "kernels." These parameters represent a transform function that can be applied to an input with the result being a classification, or semantically labeled output.

To train large models in a reasonable amount of time, training can be performed in parallel across multiple GPUs, using one of two approaches: model parallelism or data parallelism. Using model parallelism, or model parallel processing, an entire DNN model is replicated on multiple GPU-equipped computing devices (which might be referred to herein as "workers" or "worker devices"), with each worker processing a different subset of the training data. Weight updates computed on individual worker devices are aggregated to obtain a final weight update that reflects updates across all of the training data. The amount of data communicated between worker devices during and after each aggregation is proportional to the size of the DNN model.

Although model parallelism enables training of very large models, traditional model parallelism is inefficient for training DNN models because DNN training requires that a forward pass traverse all layers before a backward pass can determine parameter updates. As a result, traditional model parallelism can lead to severe underutilization of computing resources because it either actively uses only one worker device at a time (if partitioned between layers) or cannot overlap computation and communication (if each layer is partitioned).

In data parallelism, or data parallel processing, the training data set is partitioned across multiple GPUs. Each GPU maintains a full copy of the DNN model and trains on its own partition of training data, while periodically synchronizing weights with other GPUs. The frequency of weight synchronization affects both statistical efficiency and hardware efficiency. Synchronization of weights at the end of processing of every minibatch (which might be referred to as bulk synchronous parallel or "BSP") reduces the amount of staleness in training, ensuring statistical efficiency. However, BSP requires each GPU to wait for gradients from other GPUs, thus significantly lowering hardware efficiency.

Although data parallel DNN training can work well with some DNN models that have high computation-to-communication ratios, two trends threaten its efficacy. First, growing DNN model sizes increase per-aggregation network communication. In fact, some current DNN models are large enough that the data communication overheads eclipse GPU computation time, limiting scaling and dominating total DNN training time. Second, rapid increases in GPU compute capacity further shift the bottleneck of DNN training toward data communication for all types of DNN models. The technologies disclosed herein address these and potentially other considerations.

Referring now to the drawings, in which like numerals represent like elements throughout the several FIGS., aspects of various technologies for performant pipeline parallel DNN training will be described. In the following detailed description, references are made to the accompanying drawings that form a part hereof, and which are shown by way of illustration specific configurations or examples.

FIG. 1 is a computing architecture diagram that shows aspects of a system disclosed herein for pipeline parallel DNN training. As will be discussed in greater detail below, the system illustrated in FIG. 1 partitions a DNN and assigns subsets of layers of the DNN to different worker devices for training. The system also pipelines processing of mini-batches of training data, injecting multiple minibatches at the worker device processing the first DNN layer before processing of previous layers have completed. This can keep the processing pipeline full and ensures concurrent processing on the worker devices (i.e. each worker processes a different minibatch at any particular point in time). The disclosed system also uses data parallelism for selected subsets of layers to balance computation load among worker devices. This combination of pipelining, model parallelism, and data parallelism is referred to herein as "pipeline parallel" DNN training.

As shown in FIG. 1, a DNN definition 102 is utilized in some configurations that describes the architecture of a DNN model 100. For example, and without limitation, the DNN definition 102 can include data describing the architecture of a DNN model 100 including, but not limited to, the layers of the DNN model 100, the configuration of the layers of the DNN model 100, and the type and volume of training data 103 to be utilized to train the DNN model 100. The DNN definition 102 is provided to a DNN profiler 104 in one configuration.

The DNN profiler 104 is a software or hardware component that determines an optimal partitioning of the layers of the DNN model 100 among the worker computing devices 112 utilized to train the DNN model 100. The input to the DNN profiler 104 is the DNN definition 102, the training data 103 to be used by the DNN model 100, and data identifying the number of worker computing devices 112 that will be utilized to train the DNN model 100. The DNN profiler 104 determines the optimal partitioning of the layers of the DNN model 100 by briefly training the DNN model 100 on a subset of the worker computing devices 112 (e.g. a single worker computing device 112) and observing the performance characteristics of the DNN model 100 in some configurations. The DNN profiler 104 trains the DNN model 100 using a subset of minibatches (e.g. 1000 minibatches) from the training data 103. The DNN profiler 104 outputs a DNN profile 106 that includes data describing the performance characteristics of the DNN model 100.

Figure 2:
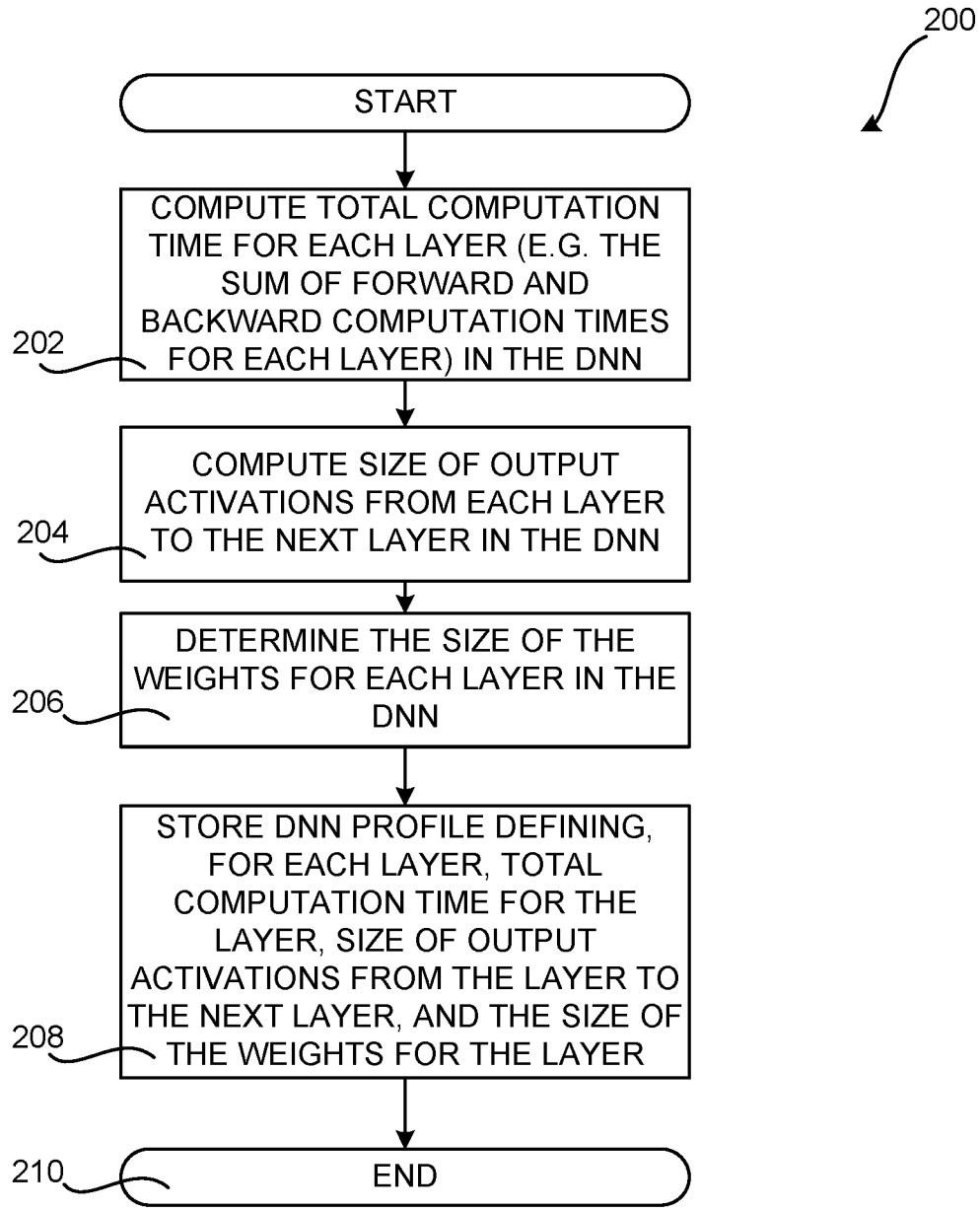
FIG. 2 is a flow diagram showing a routine that illustrates aspects of an illustrative computer-implemented process for generating a profile of a DNN.

Referring momentarily to FIG. 2, a flow diagram showing a routine 200 will be described that shows aspects of an illustrative computer-implemented process for generating the DNN profile 106. It should be appreciated that the logical operations described herein with regard to FIG. 2, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 200 begins at operation 202, where the DNN profiler 104 computes the total computation time for each layer in the DNN model 100. The total computation time for each layer is computed as the sum of the amount of time required for a forward pass and a backward pass of the layer. The routine 200 then proceeds to from operation 202 to operation 204, where the DNN profiler 104 computes the size of the output activations from each layer to the next layer in the DNN model 100. This also matches the size of the input gradients in a backward pass.

From operation 204, the routine 200 proceeds to operation 206, where the DNN profiler 104 determines the size of the weights for each layer of the DNN model. From operation 206, the routine 200 proceeds to operation 208, where the DNN profiler 104 stores the DNN profile 106. The DNN profile 106 includes data describing the total computation time for each layer, the size of output activations from each layer to the next, and the size of the weights for each layer. The DNN profile 106 can include other data describing the performance characteristics of a DNN model 100 in other configurations. From operation 208, the routine 200 proceeds to operation 210, where it ends.

As illustrated in FIG. 1, a DNN profiler 104 provides the DNN profile 106 to a DNN optimizer 108 in some configurations. The DNN optimizer 108 is a software or hardware component that utilizes the DNN profile 106 to generate optimized layer assignments 110. In order to generate the optimized layer assignments 110, the DNN optimizer 108 partitions the DNN model 100 into stages. Each of the stages includes one or more layers of the DNN model 100.

In some embodiments, the partitioning of the DNN model 100 is optimized to minimize the time required to train the DNN model 100 to a desired level of accuracy. The partitioning of the DNN model 100 might also, or alternately, be optimized to minimize data communication between the computing devices 112 or to configure the computing devices 112 used to train the DNN model 100 to perform approximately the same amount of processing during training. Partitioning the layers of the DNN model 100 might also include computing an optimal number of batches of DNN training data 103 to provide to the computing devices 112 used for training to maximize their processing efficiency.

Some or all of the stages can be configured for model parallel processing. Some or all of the stages can also be configured for data parallel processing. When data parallel processing is used, multiple worker computing devices 112 can be assigned to a given stage, each processing different minibatches during execution.

Once the DNN model has been partitioned into stages, the stages are individually assigned to GPUs 118 in the worker computing devices 112 that will train the DNN model 100. Each stage is mapped to a separate GPU 118 that performs both the forward and backward pass for all the layers of that stage. The stage that contains the input layer might be referred to herein as the input stage, and the stage that contains the output layer might be referred to herein as the output stage.

Figure 3:
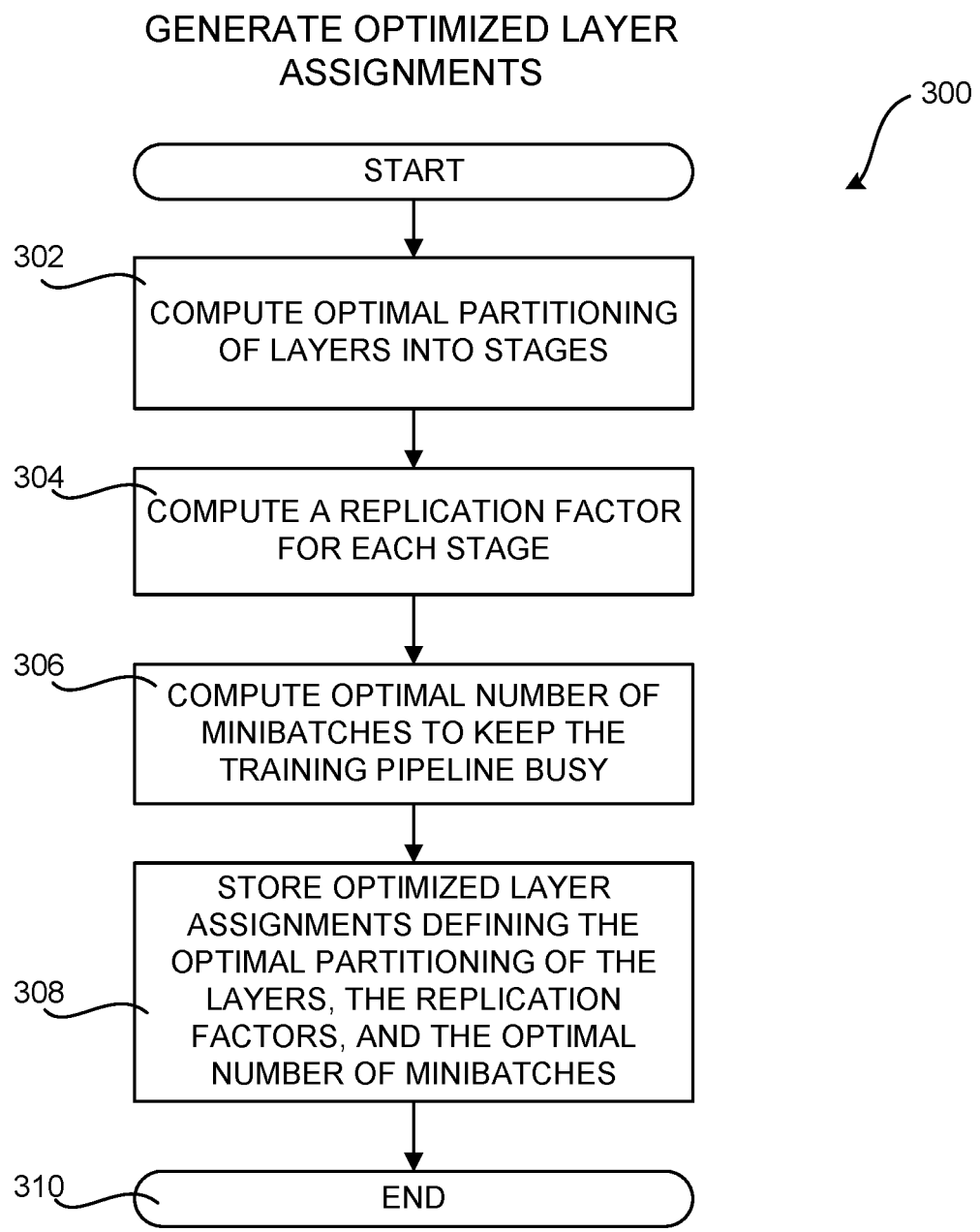
FIG. 3 is a flow diagram showing a routine that illustrates aspects of an illustrative computer-implemented process for optimizing the assignment of layers of a DNN to computing devices for pipeline parallel training of a DNN.

Referring momentarily to FIG. 3, a flow diagram showing a routine 300 will be described that illustrates aspects of an illustrative computer-implemented process for optimizing the assignment of layers of a DNN model 100 to computing devices 112 for pipeline parallel training of a DNN. The routine 300 begins at operation 302, where the DNN optimizer 108 computes the optimal partitioning of the layers of the DNN model 100 into stages. As discussed above, the partitioning of the DNN model 100 can be optimized to minimize the time to train the DNN model 100, to minimize data communication between the computing devices 112, or to configure the computing devices 112 used to train the DNN model 100 to perform approximately the same amount of processing during training. The partitioning of the DNN model 100 can be optimized for other metrics in other configurations.

From operation 302, the routine 300 proceeds to operation 304, where the DNN optimizer 108 computes a replication factor for each stage. The routine 300 then proceeds from operation 304 to operation 306, where the DNN optimizer 108 computes an optimal number of minibatches of the DNN training data 103 to provide to the computing devices 112 used for training to maximize their processing efficiency. The routine 300 then proceeds from operation 306 to operation 308, where the DNN optimizer 108 stores the optimized layer assignments 110 including, but not limited to, data defining the optimal partitioning of the layers of the DNN model 100, the replication factors, and the optimal number of minibatches of the DNN training data 103 to provide to the computing devices 112 used for training to maximize their processing efficiency. The routine 300 then proceeds from operation 308 to operation 310, where it ends.

As shown in FIG. 1, the worker computing devices 112 are configured with a 1F1B scheduling policy 116 in some configurations. The 1F1B scheduling policy configures the computing devices 112 to alternate between forward processing of the batches of the DNN training data 103 and backward processing of batches of the DNN training data 103. Additional details regarding the 1F1B scheduling policy will be described below with regard to FIGS. 5 and 6. Once the computing devices have been configured using the optimized layer assignments 110 and the 1F1B scheduling policy 116, they can begin processing the DNN training data to perform DNN training 114.

Figure 4A:
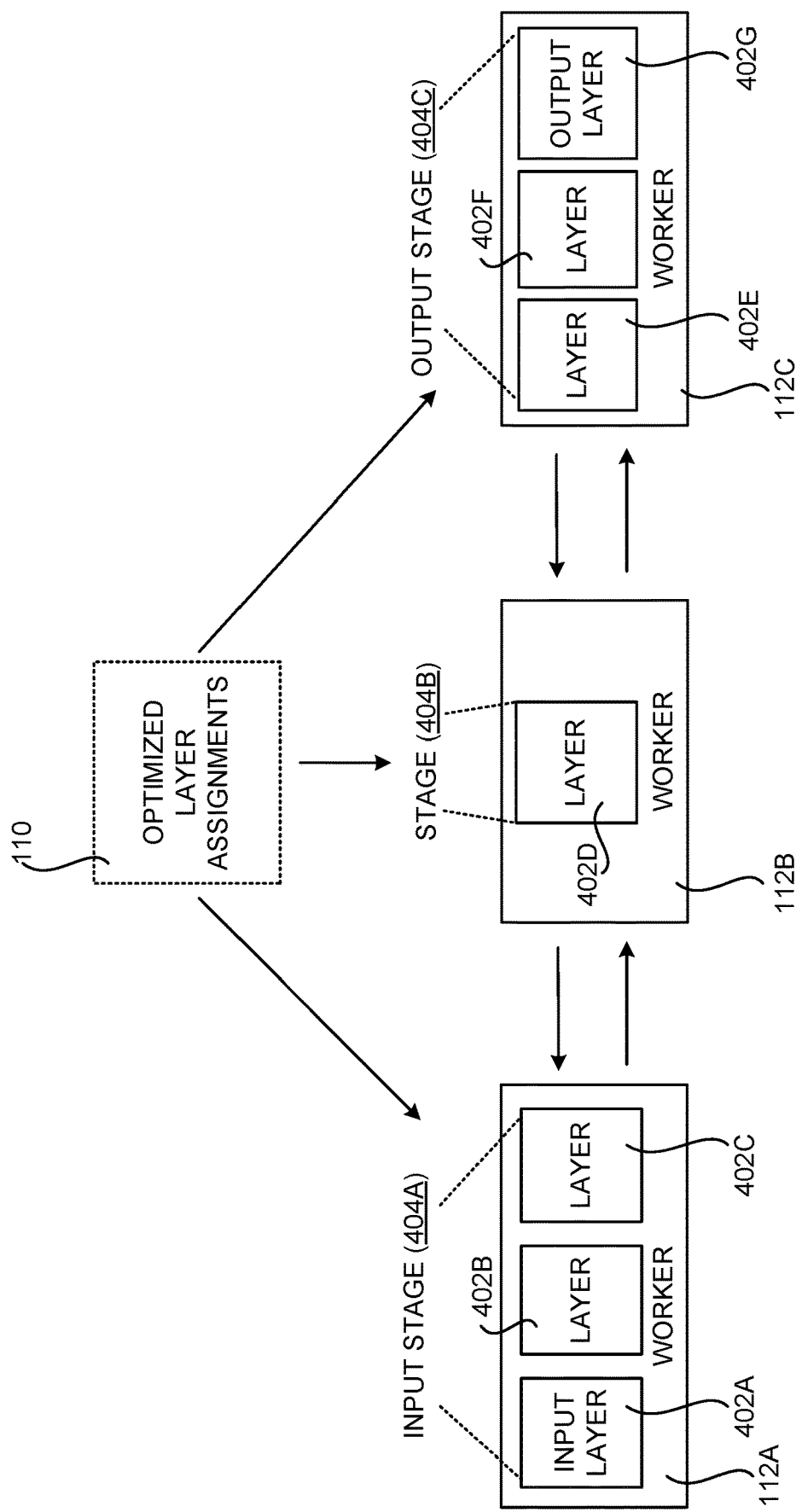
FIGS. 4A and 4B are computing system diagrams that show several example assignments of layers of a DNN to computing devices for pipeline parallel training of a DNN.
Figure 4B:
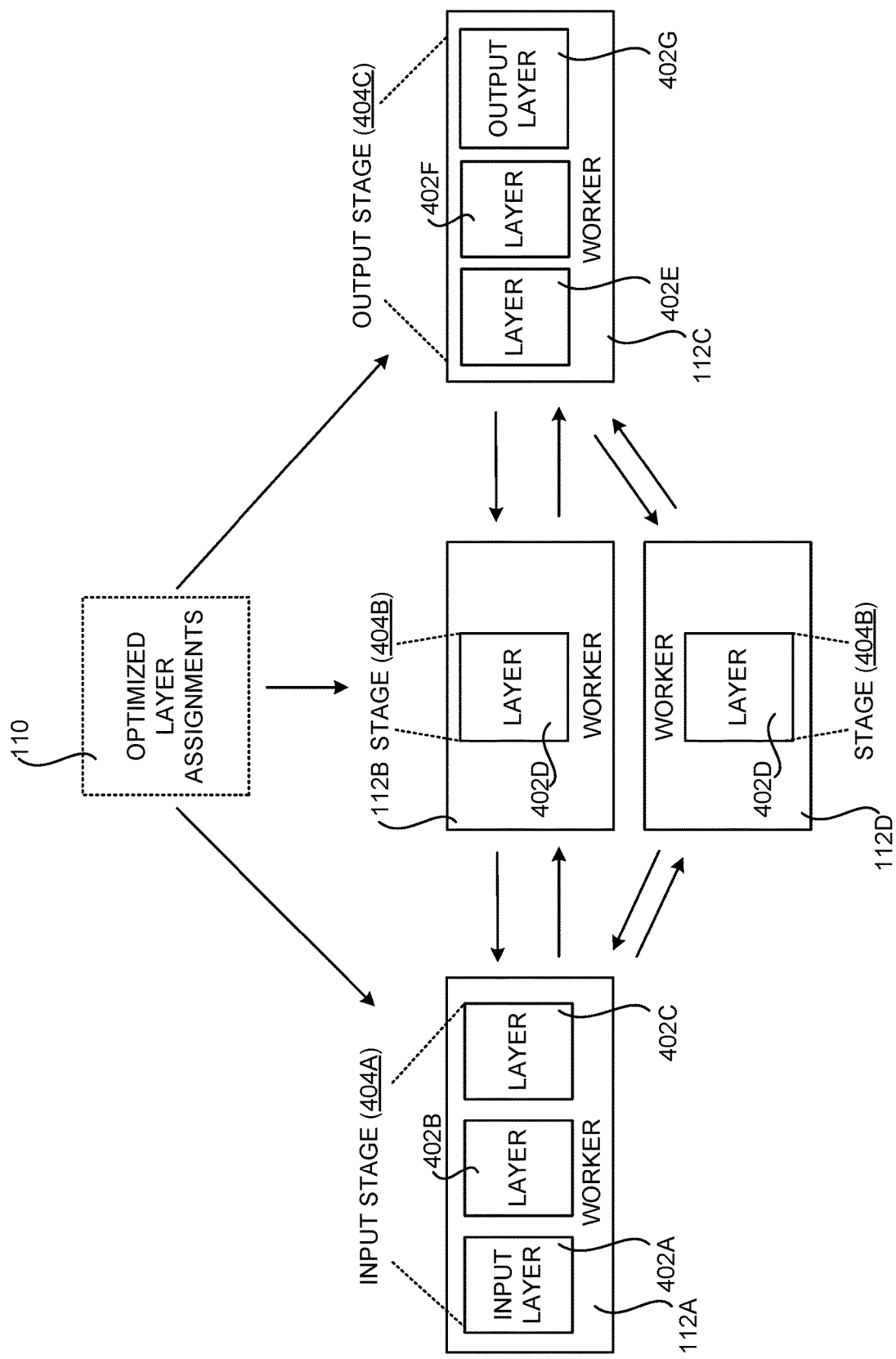

FIGS. 4A and 4B are computing system diagrams that show several example assignments of layers of a DNN model 100 to computing devices 112 for pipeline parallel training of the DNN 100. In the example configuration shown in FIG. 4A, the DNN model 100 includes seven layers 402A-402G, including an input layer 402A and an output layer 402G. In this example, the DNN optimizer 108 has generated optimized layer assignments 110 that include three stages 404A-404C. The input stage 404A includes the layers 402A-402C, the stage 404B includes the layer 402D, and the output stage 404C includes the layers 402E-402G. The stage 404A is assigned to the worker computing device 112A, the stage 404B is assigned to the worker computing device 112B, and the stage 404C is assigned to the worker computing device 112C.

In the example shown in FIG. 4A, each of the stages 404A-404C is implemented using parallel model processing. In the example shown in FIG. 4B, however, the stage 404B is implemented using data parallel processing. In this example, two worker computing devices 112B and 112D implement the stage 404B by operating on different minibatches of the DNN training data 103.

Figure 5:
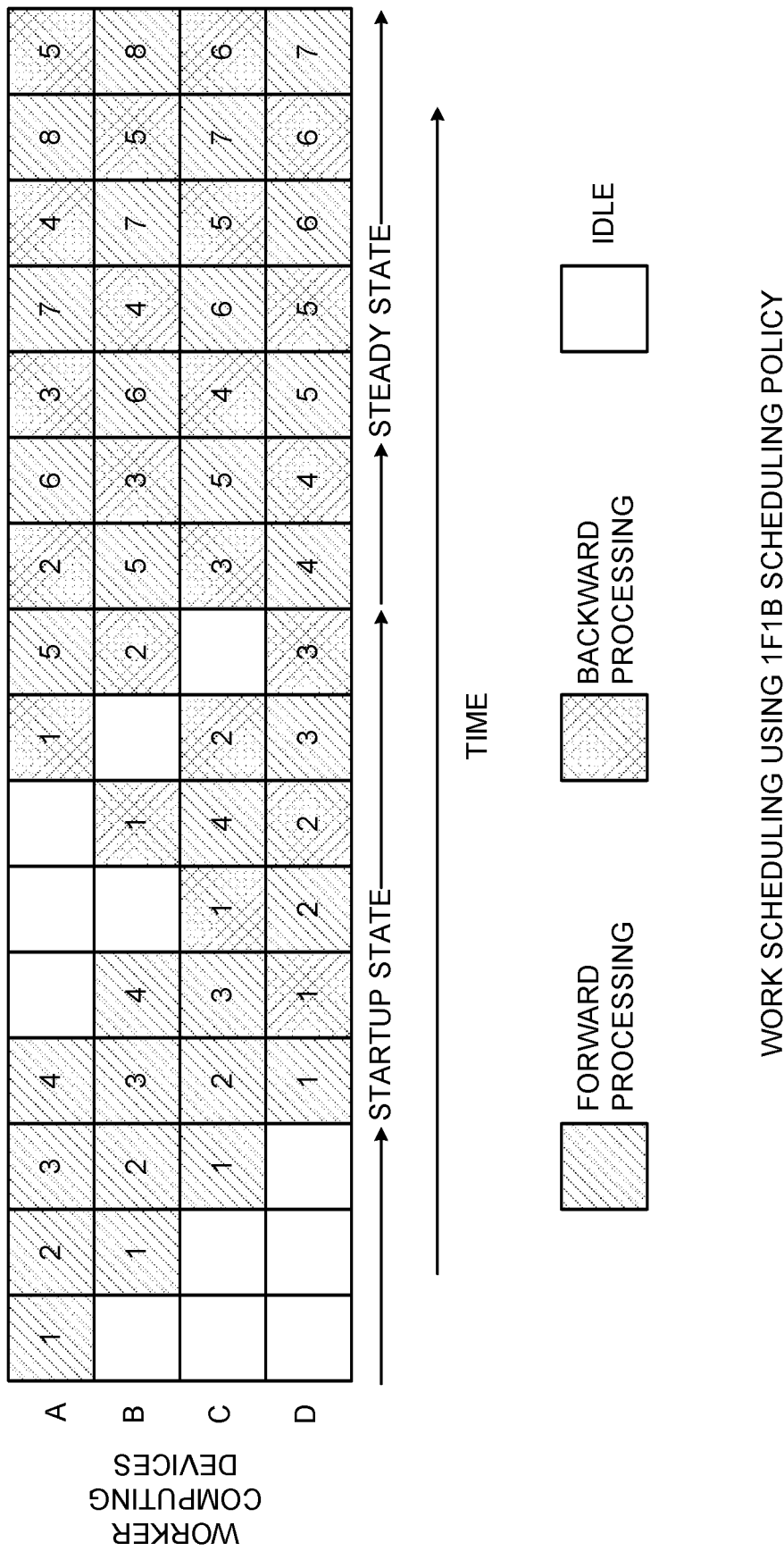
FIG. 5 is a workflow diagram that shows aspects of a one-forward one-backward scheduling policy disclosed herein for assigning work to computing devices for pipeline parallel DNN training.

FIG. 5 is a workflow diagram that shows aspects of a 1F1B scheduling policy 116 disclosed herein for assigning minibatches of training data 103 to computing devices 112 for pipeline parallel DNN training. As discussed briefly above, the 1F1B scheduling policy 116 configures the computing devices 112 to alternate between forward processing of the batches of the DNN training data 103 and backward processing of the batches of the DNN training data 103.

Unlike traditional unidirectional pipelines, DNN training is bidirectional (i.e. the forward pass is followed by a backward pass through the same layers in reverse order). The 1F1B scheduling policy 116 interleaves forward and backward minibatch processing on each worker computing device 112 and routes minibatches of the training data 103 through the same workers 112 on the backward pass. This helps to keep all worker computing devices 112 busy without pipeline stalls, while preventing excessive in-progress minibatches.

In the example shown in FIG. 5, four worker computing devices 112 implement the four stages of a DNN model 100 and process minibatches of training data 103. The row of the workflow diagram labelled 'A' corresponds to the first worker 112, the row labelled 'B' corresponds to the second worker 112, the row 'C' corresponds to the third worker 112, and row 'D' corresponds to the fourth worker 112. The numbers in the boxes in each row indicate the number of the minibatch that is currently being processed by the corresponding worker 112. Boxes with diagonal lines indicate that a minibatch is being processed in the forward direction, boxes with cross-hatched lines indicate that a minibatch is being processed in the backward direction, and boxes with no lines indicate that a worker 112 is idle during the corresponding period of time.

In a startup state, the input stage admits a sufficient number of minibatches of training data 103 (four in this example) to keep the pipeline full for when it settles into steady state. These minibatches propagate their way to the output stage. As soon as the output stage completes the forward pass for the first minibatch, it performs the backward pass for the same minibatch, and then starts alternating between performing forward and backward passes for subsequent minibatches. This can be seen in row D of the workflow diagram shown in FIG. 5. As the backward pass starts propagating to earlier stages in the pipeline, every stage begins alternating between forward and backward passes for different minibatches. Each worker 112 is, therefore, busy either doing the forward pass or backward pass for a minibatch in the steady state.

On completing the forward pass for a minibatch, each stage asynchronously sends its output activations to the next stage, while simultaneously starting to perform work for another minibatch. Similarly, after completing backward work for a minibatch, each stage asynchronously sends the gradients to the previous stage, while starting computation for another minibatch.

When stages run in a data parallel configuration replicated across multiple GPUs (as in the example shown in FIG. 4B), deterministic round-robin load balancing can be utilized to distribute work from the previous stages across the GPUs. This deterministic loadbalancing ensures that backward work for a minibatch passes through the same stages it passed through in its forward work phase. Both the 1F1B scheduling policy for stages in a pipeline and the round-robin scheduling policy for load balancing across replicated stages are static policies. Thus, they can be executed by each worker 112 independently without requiring expensive distributed coordination.

Figure 6:
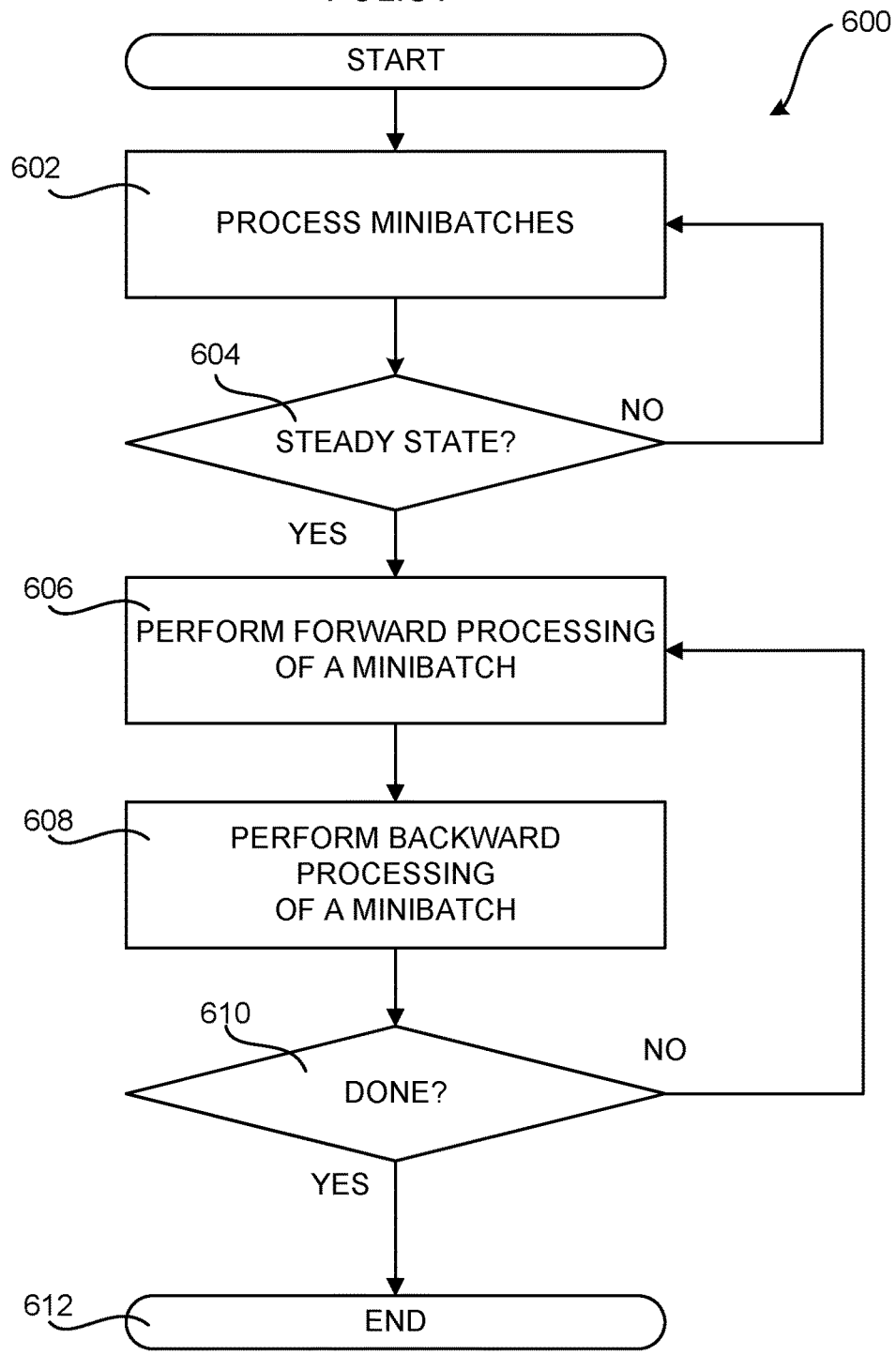
FIG. 6 is a flow diagram showing a routine that illustrates aspects of an illustrative computer-implemented process for performing pipeline parallel DNN training using a one-forward one-backward scheduling policy.

FIG. 6 is a flow diagram showing a routine 600 that illustrates aspects of an illustrative computer-implemented process for performing pipeline parallel DNN training using a 1F1B scheduling policy 116. The routine 600 begins at operation 602, where a worker computing device 112 begins processing minibatches of the training data 103.

The routine 600 then proceeds from operation 602 to operation 604, where the worker computing device 112 determines if it has reached steady state. If so, the routine 600 proceeds from operation 604 to operation 606. If not, the routine 600 proceeds back to operation 602. At operation 606, the worker computing device 112 performs the forward processing for a minibatch of training data 103. The routine 600 then proceeds from operation 606 to operation 608, where the worker computing device 112 performs the backward processing for a minibatch. The routine 600 then proceeds to operation 610 where the worker computing device 112 determines whether all of the training data 103 has been processed. If not, the routine returns to operation 606. Once all of the training data 103 has been processed, the routine 600 proceeds from operation 610 to operation 612, where it ends.

The technologies disclosed herein can also implement other optimizations of the DNN model 100 training pipeline. In particular, weight stashing is utilized in some configurations to maintain multiple versions of the weights, one for each active minibatch.

When performing forward work, each stage processes a minibatch using the latest version of weights available. After completing the forward work, a copy of the weights is stored as part of the intermediate state for that minibatch. When performing the backward pass for a minibatch, the same version of the weights is used to compute the weight gradient. In this manner, weight stashing ensures that within a stage, the same version of model parameters are used for both the forward and backward work of a given minibatch. Other optimizations including, but not limited to, pre-allocating all GPU memory needed at the start of training to minimize dynamic memory allocation can also be utilized.

Figure 7:
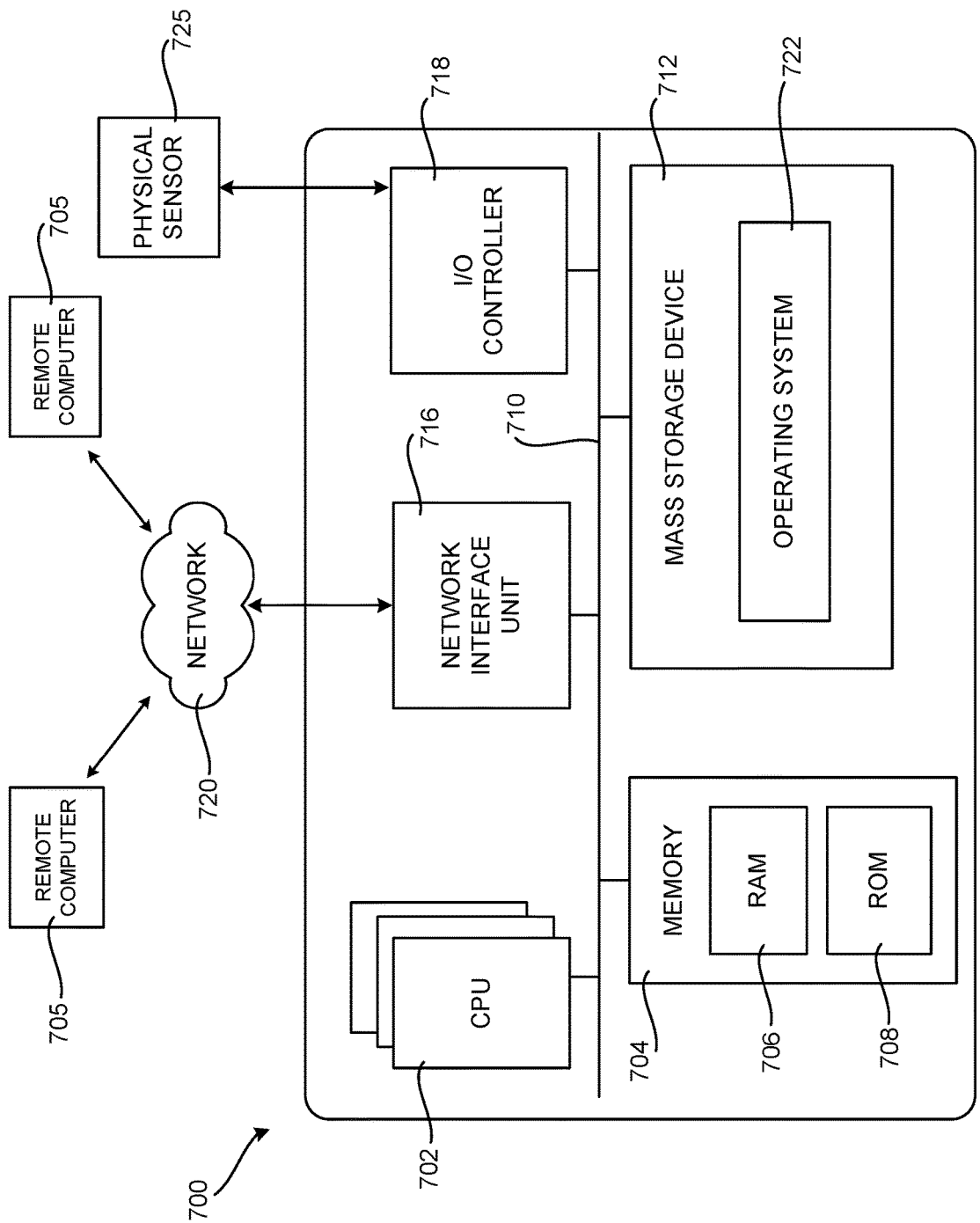
FIG. 7 is a computer architecture diagram showing an illustrative computer hardware and software architecture for a computing device that can implement aspects of the technologies presented herein.

FIG. 7 is a computer architecture diagram showing an illustrative computer hardware and software architecture for a computing device that can implement the various technologies presented herein. In particular, the architecture illustrated in FIG. 7 can be utilized to implement a server computer, mobile phone, an e-reader, a smartphone, a desktop computer, an alternate reality or virtual reality ("AR/VR") device, a tablet computer, a laptop computer, or another type of computing device.

While the subject matter described herein is presented in the general context of server computers performing parallelized training of a DNN model, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

The computer 700 illustrated in FIG. 7 includes one or more central processing units 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the computer 700, such as during startup, can be stored in the ROM 708. The computer 700 further includes a mass storage device 712 for storing an operating system 722, application programs, and other types of programs. The mass storage device 712 can also be configured to store other types of programs and data, such as the DNN definition 102, the DNN profiler 104, the DNN profile 106, the DNN optimizer 108, and the optimized layer assignments 110 (not shown in FIG. 7).

The mass storage device 712 is connected to the CPU 702 through a mass storage controller (also not shown in FIG. 7) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 720. The computer 700 can connect to the network 720 through a network interface unit 716 connected to the bus 710. It should be appreciated that the network interface unit 716 can also be utilized to connect to other types of networks and remote computer systems. The computer 700 can also include an input/output controller 718 for receiving and processing input from a number of other devices, including a keyboard, mouse, touch input, an electronic stylus (also not shown in FIG. 7), or a physical sensor such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall computer 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer storage media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
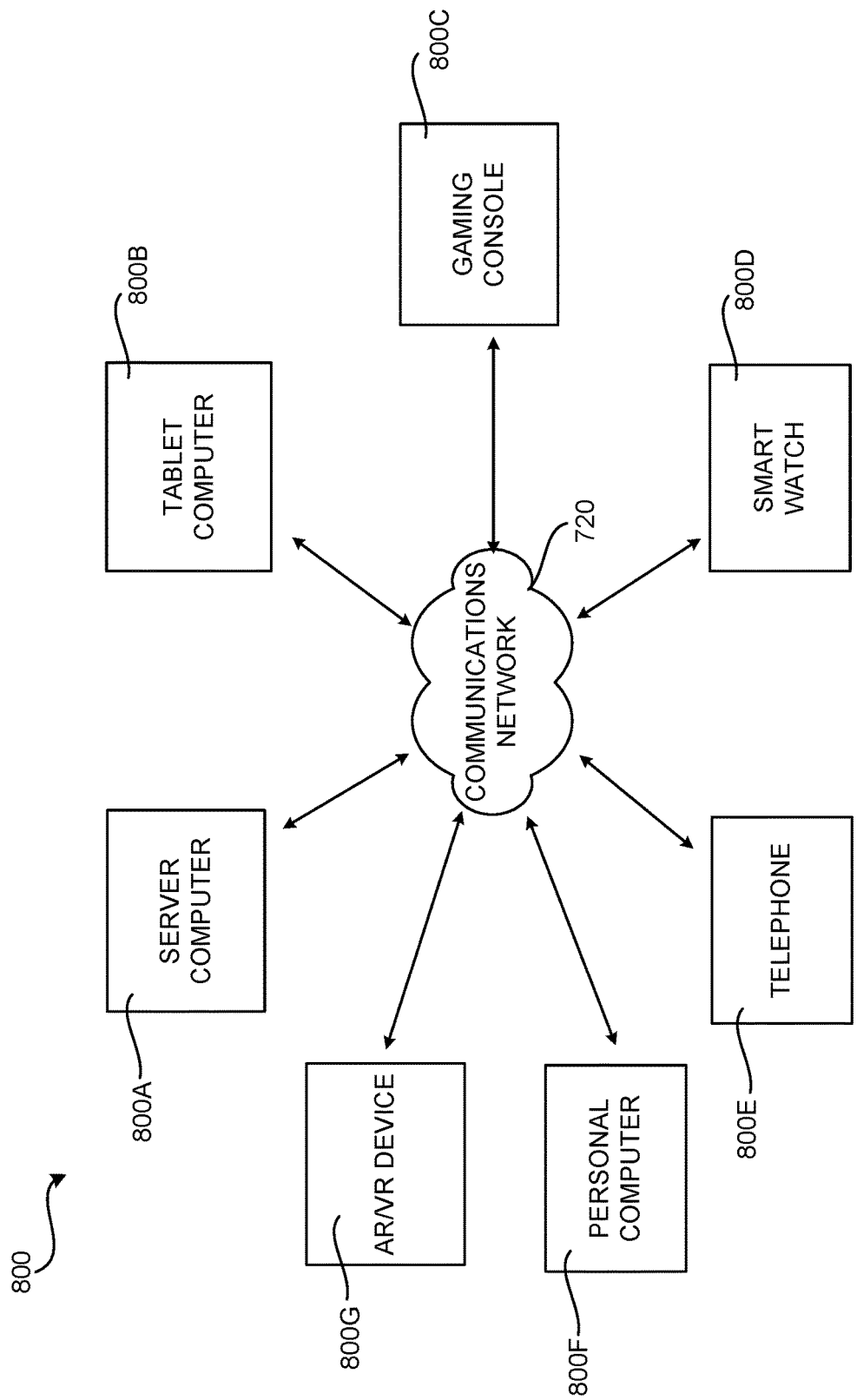
FIG. 8 is a network diagram illustrating a distributed computing environment in which aspects of the disclosed technologies can be implemented.

FIG. 8 is a network diagram illustrating a distributed network computing environment 800 in which aspects of the disclosed technologies can be implemented, according to various configurations presented herein. As shown in FIG. 8, one or more server computers 800A can be interconnected via a communications network 720 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 800B, a gaming console 800C, a smart watch 800D, a telephone 800E, such as a smartphone, a personal computer 800F, and an AR/VR device 800G.

In a network environment in which the communications network 720 is the Internet, for example, the server computer 800A can be a dedicated server computer operable to process and communicate data to and from the client computing devices 800B-800G via any of a number of known protocols, such as, hypertext transfer protocol ("HTTP"), file transfer protocol ("FTP"), or simple object access protocol ("SOAP"). Additionally, the networked computing environment 800 can utilize various data security protocols such as secured socket layer ("SSL") or pretty good privacy ("PGP"). Each of the client computing devices 800B-800G can be equipped with an operating system operable to support one or more computing applications or terminal sessions such as a web browser (not shown in FIG. 8), or other graphical user interface (not shown in FIG. 8), or a mobile desktop environment (not shown in FIG. 8) to gain access to the server computer 800A.

The server computer 800A can be communicatively coupled to other computing environments (not shown in FIG. 8) and receive data regarding a participating user's interactions/resource network. In an illustrative operation, a user (not shown in FIG. 8) may interact with a computing application running on a client computing device 800B-800G to obtain desired data and/or perform other computing applications.

The data and/or computing applications may be stored on the server 800A, or servers 800A, and communicated to cooperating users through the client computing devices 800B-800G over an exemplary communications network 720. A participating user (not shown in FIG. 8) may request access to specific data and applications housed in whole or in part on the server computer 800A. These data may be communicated between the client computing devices 800B-800G and the server computer 800A for processing and storage.

The server computer 800A can host computing applications, processes and applets for the generation, authentication, encryption, and communication of data and applications, and may cooperate with other server computing environments (not shown in FIG. 8), third party service providers (not shown in FIG. 8), network attached storage ("NAS") and storage area networks ("SAN") to realize application/data transactions.

It should be appreciated that the computing architecture shown in FIG. 7 and the distributed network computing environment shown in FIG. 8 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

EXAMPLE A: A computer-implemented method for parallelizing training of a DNN model, comprising: generating a profile of a deep neural network (DNN) model, the DNN model comprising a plurality of layers; partitioning the layers of the DNN model into a plurality of stages based on the profile, wherein each of the plurality of stages comprises one or more of the layers of the DNN model, and wherein the partitioning is optimized to minimize a time to train the DNN model; and causing the plurality of computing devices to train the DNN model.

EXAMPLE B: The computer-implemented method of example A, wherein the partitioning is further optimized to minimize data communication between the computing devices.

EXAMPLE C: The computer-implemented method of any of examples A-B, wherein the partitioning is further optimized such that each of the plurality of computing devices performs approximately the same amount of processing during training of the DNN model.

EXAMPLE D: The computer-implemented method of any of examples A-C, wherein partitioning the layers of the DNN model further comprises computing an optimal number of batches of DNN training data to be provided to the plurality of computing devices to maximize a processing efficiency of the plurality of computing devices.

EXAMPLE E: The computer-implemented method of any of examples A-D, further comprising assigning at least one of the plurality of stages to each of a plurality of computing devices, the computing devices configured to process batches of DNN training data to train the DNN model by alternating between forward processing of the batches of the DNN training data and backward processing of batches of the DNN training data.

EXAMPLE F: The computer-implemented method of any of examples A-E, wherein at least one of the plurality of stages is configured for model parallel processing.

EXAMPLE G: The computer-implemented method of any of examples A-F, wherein at least one of the plurality of stages is configured for data parallel processing.

EXAMPLE H: The computer-implemented method of any of examples A-G, wherein at least one of the plurality of stages is configured for model parallel processing and wherein at least one of the plurality of stages is configured for data parallel processing.

EXAMPLE I: A computing device, comprising: one or more processors; and at least one computer storage media having computer-executable instructions stored thereupon which, when executed by the one or more processors, will cause the computing device to: partition the layers of a DNN model into a plurality of stages, wherein each of the plurality of stages comprises one or more of the layers of the DNN model, and wherein the partitioning is optimized to minimize a time to train the DNN model; and assign at least one of the plurality of stages to each of a plurality of worker computing devices, the computing devices configured to process batches of DNN training data to train the DNN model by alternating between forward processing of the batches of the DNN training data and backward processing of batches of the DNN training data.

EXAMPLE J: The computing device of example I, wherein the partitioning is further optimized to minimize data communication between the worker computing devices.

EXAMPLE K: The computing device of any of examples I-J, wherein the partitioning is further optimized such that each of the plurality of computing devices performs approximately the same amount of processing during training of the DNN model.

EXAMPLE L: The computing device of any of examples I-K, wherein at least one of the plurality of stages is configured for model parallel processing and wherein at least one of the plurality of stages is configured for data parallel processing.

EXAMPLE M: The computing device of any of examples I-L, wherein the at least one computer storage media has further computer-executable instructions stored thereupon to: generate a profile of the deep neural network (DNN) model; partition the layers of the DNN module into the plurality of stages based upon the profile.

EXAMPLE N: The computing device of any of examples I-M, wherein the profile of the DNN module is generated by training the DNN model on a subset of the plurality of the worker computing devices with a subset of the DNN training data for a predetermined period of time.

EXAMPLE O: A computer storage media having computer-executable instructions stored thereupon which, when executed by one or more processors of a computing device, will cause the computing device to: partition the layers of a deep neural network (DNN) model into a plurality of stages, wherein each of the plurality of stages comprises one or more of the layers of the DNN model, and wherein the partitioning is optimized to minimize a time to train the DNN model; and assign at least one of the plurality of stages to each of a plurality of worker computing devices, the computing devices configured to process batches of DNN training data to train the DNN model by alternating between forward processing of the batches of the DNN training data and backward processing of the batches of the DNN training data.

EXAMPLE P: The computer storage media of example O, wherein the partitioning is further optimized to minimize data communication between the worker computing devices.

EXAMPLE Q: The computer storage media of any of examples O-P, wherein the partitioning is further optimized such that each of the plurality of computing devices performs approximately the same amount of processing during training of the DNN model.

EXAMPLE R: The computer storage media of any of examples O-Q, wherein partitioning the layers of the DNN model further comprises computing an optimal number of the batches of the DNN training data to be provided to the plurality of computing devices to maximize a processing efficiency of the plurality of computing devices.

EXAMPLE S: The computer storage media of any of examples O-R, wherein the computer storage media has further computer-executable instructions stored thereupon to: generate a profile of the DNN model; and partition the layers of the DNN module into the plurality of stages based upon the profile.

EXAMPLE T: The computer storage media of any of examples O-S, wherein the profile of the DNN module is generated by training the DNN model on a subset of the plurality of the worker computing devices with a subset of the DNN training data for a predetermined period of time.

Based on the foregoing, it should be appreciated that technologies for highly performant pipeline parallel DNN training have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for training a deep neural network (DNN) model utilizing a processing pipeline, the method comprising:
    generating a profile of the DNN model by executing the DNN model on a plurality of worker computing devices with a subset of DNN training data for a predetermined time period, the DNN training data comprising a plurality of minibatches and the DNN model comprising a plurality of layers;
    partitioning the plurality of layers of the DNN model into a plurality of stages based on the profile, wherein each of the plurality of stages comprises one or more of the plurality of layers of the DNN model, and wherein the partitioning minimizes a time to train the DNN model;
    assigning the plurality of stages to the plurality of worker computing devices based upon the partitioning;
    admitting, in a startup state, a subset of the plurality of minibatches of DNN training data to the processing pipeline, wherein the subset of the plurality of minibatches comprises a number of minibatches such that an individual worker computing device of the plurality of worker computing devices does not idle during a steady state; and
    training the DNN model using a one-forward one-backward scheduling policy, whereby in the steady state:
        a first worker computing device of the plurality of worker computing devices performs forward processing and backward processing for the plurality of layers of the DNN model in a first assigned stage and a second worker computing device of the plurality of worker computing devices performs forward and backward processing for the plurality of layers of the DNN model in a second assigned stage different than the first assigned stage,
        the first worker computing device of the plurality of worker computing devices alternates between performing forward processing of first minibatches in the subset of the plurality of minibatches of training data and backward processing of the first minibatches in the subset of the plurality of minibatches of training data, and
        the second worker computing device of the plurality of worker computing devices alternates between performing forward processing of second minibatches in the subset of the plurality of minibatches of training data and backward processing of third minibatches in the subset of the plurality of minibatches of training data different from the second minibatches in the subset of the plurality of minibatches of training data.

2. The computer-implemented method of claim 1, wherein the partitioning further minimizes data communication between the plurality of worker computing devices.

3. The computer-implemented method of claim 1, wherein the partitioning causes each of the plurality of worker computing devices to perform a same amount of processing during training of the DNN model.

4. The computer-implemented method of claim 1, wherein at least one of the plurality of worker computing devices is configured for model parallel processing, whereby the DNN model is replicated to the at least one of the plurality of worker computing devices for training.

5. The computer-implemented method of claim 1, wherein multiple worker computing devices of the plurality of worker computing devices are configured for data parallel processing, whereby the multiple worker computing devices of the plurality of worker computing devices are assigned to process the one or more of the plurality of layers of the DNN in a stage, each of the multiple worker computing devices of the plurality of worker computing devices processing different minibatches of the plurality of minibatches of training data during training.

6. The computer-implemented method of claim 1,
    wherein at least one of the plurality of worker computing devices is configured for model parallel processing, whereby the DNN model is replicated to the at least one of the plurality of worker computing devices for training, and
    wherein multiple worker computing devices of the plurality of worker computing devices are configured for data parallel processing, whereby the multiple worker computing devices of the plurality of worker computing devices are configured to process the one or more plurality of layers of the DNN in a stage, each of the multiple worker computing devices of the plurality of worker computing devices processing different minibatches of the plurality of minibatches of training data during training.

7. A computing device for training a deep neural network (DNN) model, utilizing a processing pipeline, the system comprising:
    one or more processors; and
    at least one non-transitory computer storage medium having computer-executable instructions stored thereupon which, when executed by the one or more processors, will cause the computing device to:
        generate a profile of the DNN model by executing the DNN model on a plurality of worker computing devices with a subset of DNN training data for a predetermined time period, the DNN training data comprising a plurality of minibatches and the DNN model comprising a plurality of layers;
        partition the plurality of layers of the DNN model into a plurality of stages, wherein each of the plurality of stages comprises one or more of the plurality of layers of the DNN model, and wherein the partitioning minimizes a time to train the DNN model;
        assign the plurality of stages to the plurality of worker computing devices based upon the partitioning;
        admit, in a startup state, a subset of the plurality of minibatches of DNN training data to the processing pipeline, wherein the subset of the plurality of minibatches comprises a number of minibatches such that an individual worker computing device of the plurality of worker computing devices does not idle during a steady state; and
        train the DNN model using a one-forward one-backward scheduling policy, whereby in the steady state:
            a first worker computing device of the plurality of worker computing devices performs forward processing and backward processing for the plurality of layers of the DNN model in a first assigned stage and a second worker computing device of the plurality of worker computing devices performs forward and backward processing for the plurality of layers of the DNN model in a second assigned stage different than the first assigned stage, the first worker computing device of the plurality of worker computing devices alternates between performing forward processing of first minibatches in the subset of the plurality of minibatches of training data and backward processing of the first minibatches in the subset of the plurality of minibatches of training data, and the second worker computing device of the plurality of worker computing devices alternates between performing forward processing of second minibatches in the subset of the plurality of minibatches of training data and backward processing of third minibatches in the subset of the plurality of minibatches of training data different from the second minibatches in the subset of the plurality of minibatches of training data.

8. The computing device of claim 7, wherein the partitioning is further minimizes data communication between the plurality of worker computing devices.

9. The computing device of claim 7, wherein the partitioning causes each of the plurality of worker computing devices to perform a same amount of processing during training of the DNN model.

10. The computing device of claim 7,
wherein at least one of the plurality of worker computing devices performs model parallel processing, whereby the DNN model is replicated to the at least one of the plurality of worker computing devices for training, and
wherein multiple worker computing devices of the plurality of worker computing devices perform data parallel processing, whereby the multiple worker computing devices of the plurality of worker computing devices process the one or more of the plurality of layers of the DNN in a stage, each of the multiple worker computing devices of the plurality of worker computing devices processing different minibatches of the plurality of minibatches of the DNN training data during training.

11. A non-transitory computer storage medium having computer-executable instructions stored thereupon which, when executed by one or more processors of a computing device, cause the computing device to:
generate a profile of a deep neural network (DNN) model by executing the DNN model on a plurality of worker computing devices with a subset of DNN training data for a predetermined time period, the DNN training data comprising a plurality of minibatches and the DNN model comprising a plurality of layers;
partition the plurality of layers of the DNN model into a plurality of stages, wherein each of the plurality of stages comprises one or more of the plurality of layers of the DNN model, and wherein the partitioning minimizes a time to train the DNN model;
assign the plurality of stages to the plurality of worker computing devices based on the partitioning;
admit, in a startup state, a subset of the plurality of minibatches of DNN training data to a processing pipeline, wherein the subset of the plurality of minibatches comprises a number of minibatches such that an individual worker computing device of the plurality of worker computing devices does not idle during a steady state; and
train the DNN model using a one-forward one-backward scheduling policy, whereby in the steady state:
a first worker computing device of the plurality of worker computing devices performs forward processing and backward processing for the plurality of layers of the DNN model in a first assigned stage and a second worker computing device of the plurality of worker computing devices performs forward and backward processing for the plurality of layers of the DNN model in a second assigned stage different than the first assigned stage,
the first worker computing device of the plurality of worker computing devices alternates between performing forward processing of first minibatches in the subset of the plurality of minibatches of training data and backward processing of the first minibatches in the subset of the plurality of minibatches of training data, and
the second worker computing device of the plurality of worker computing devices alternates between performing forward processing of second minibatches in the subset of the plurality of minibatches of training data and backward processing of third minibatches in the subset of the plurality of minibatches of training data different from the second minibatches in the subset of the plurality of minibatches of training data.

12. The non-transitory computer storage medium of claim 11, wherein the partitioning is further minimizes data communication between the plurality of worker computing devices.

13. The non-transitory computer storage medium of claim 11, wherein the partitioning causes each of the plurality of worker computing devices to perform a same amount of processing during training of the DNN model.

* * * * *